Aug. 26, 1969  J. A. LEIBUNDGUT  3,463,053
RELIEF VALVE FOR FLUID MOTOR
Filed Oct. 16, 1967

INVENTOR.
JAMES A. LEIBUNDGUT
BY
Petherbridge, O'Neill & Aubel
ATTORNEYS

United States Patent Office 3,463,053
Patented Aug. 26, 1969

3,463,053
RELIEF VALVE FOR FLUID MOTOR
James A. Leibundgut, Waterford, Wis., assignor to Applied Power Industries, Inc., Milwaukee, Wis., a corporation of Wisconsin
Filed Oct. 16, 1967, Ser. No. 675,457
Int. Cl. F01l 25/06; F15b 11/06; F16k 17/20
U.S. Cl. 91—240          2 Claims

ABSTRACT OF THE DISCLOSURE

A relief valve is disclosed capable of being coupled to the pressure chamber of a motor to limit the pressure developed in the chamber of fluid-type motors such as pneumatically powered reciprocating piston-type motors or rotary-type motors.

CROSS-REFERENCES TO RELATED APPLICATIONS

This application is related to Patent No. 3,079,900 assigned to the same assignee as the present invention and is also related to Patent No. 3,041,975 likewise assigned to the same assignee as the present invention.

BACKGROUND OF THE INVENTION

Field of the invention

This invention relates to relief valving for fluid motors, and the most recent Patent Office classifications known to applicant's attorneys of related applications are Classes 91—290 and 103—50.

Description of the prior art

The most pertinent prior art known is that listed above; namely, U.S. Patents Nos. 3,079,900 and 3,041,975.

SUMMARY OF THE INVENTION

Applicant's invention is an improvement over Patent No. 3,079,900 to include a new relief valve for fluid-type motors.

The valve includes means for permitting a certain pressure in the chamber to initially move the valve from its seat. The initial opening of the valve then permits a pressure to be asserted on a larger area of the valve to increase the force applied to the valve to rapidly open the valve to thereby vent the chamber to ambient or atmospheric pressure.

DESCRIPTION OF THE PREFERRED EMBODIMENT OF THE INVENTION

A preferred embodiment of the structure of the invention shown in FIGURE 1 will first be described in detail, and then the functional operation thereof will be described.

Figure 1:
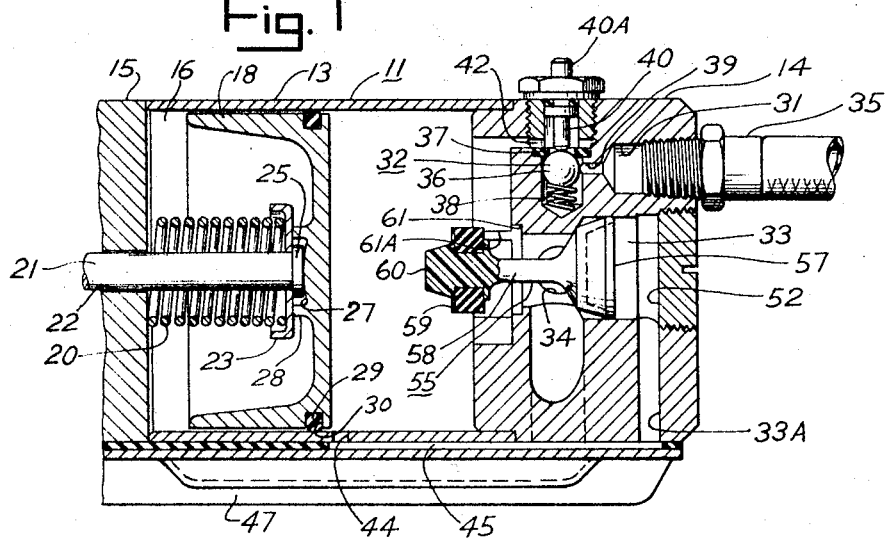
FIGURE 1 is a longitudinal section through the air-powered motor, partially in cross-section, embodying the invention.
Figure 2:
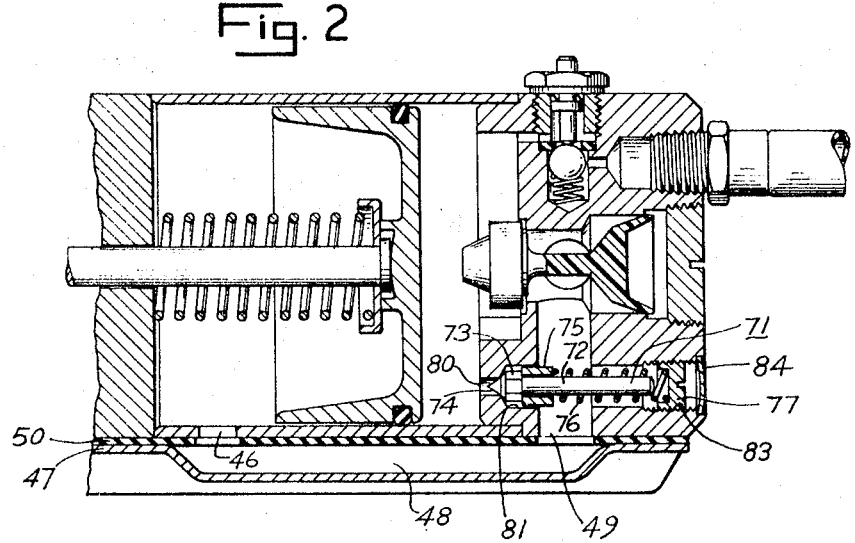
FIGURE 2 is a similar view as FIGURE 1 showing the relief valve of the invention partially in cross-section and with the relief valve being in a closed position.

The fluid motor 11, as shown in FIGURES 1 and 2, comprises a hollow cylindrical body 13 having end closures 14 and 15 for forming a displacement chamber 16. A piston member 18 is mounted within chamber 16. The piston 18 is resiliently urged toward the right-hand end of the chamber 16 (as oriented in FIGURE 1) by a compression spring 20. The spring 20 is seated between the end closure 15 and the adjacent face of the piston 18.

A shaft or rod 21 extends through a center aperture 22 in the end closure 15 and between the coils of spring 20 to cooperate with an annular cup-shaped plate 23. One end of the spring is seated in plate 23 thus retaining spring 20 in position. The right-hand end of the rod 21 is provided with an annular head 25 which is loosely seated against the convex bottom surface of a central cylindrical recess 27 formed in the left-hand face of the piston 18. Head 25 retains plate 23 in position. The rod 21 may constitute the hydraulic pump plunger or it may be suitably connected to a desired load.

A suitable seal 29 is confined in an annular groove 30 of piston 18 to provide a slidable and sealing contact between the piston 18 and the interior wall of body 13.

The end closure 14 includes an air inlet port 31, a throttle valve 32, a servo chamber 33 for a poppet valve 55, and an exhaust port 34. The inlet port 31 communicates through a suitable known type conduit 35 to a source of air under pressure, not shown. The port 31 also communicates with the chamber 16 through the throttle valve, generally labeled 32. The ball 36 of valve 32 is held in position by a compression spring 38 to normally seat against an annular ring or gasket 37 of resilient sealing material. The valve stem 40 has an exteriorly or outwardly extending projecting portion 40A adapted to be depressed to thereby cause the lower end (as oriented in FIGURE 1) of stem 40 to unseat the ball 36 and permit air under pressure to flow through valve 32 through port 42 to chamber 16. More specifically, when the stem 40 of the throttle valve 32 is depressed to unseat the ball 36, compressed air is admitted from the inlet port 31 through an orifice 39 for inlet port 31, past ball 36, through the assembly of valve 32, and through port 42 to the compression chamber 16 to act on the right-hand face (as oriented in FIGURE 1) of the piston 18 to move the piston toward the left-hand end of the chamber 16 in opposition to the force of the spring 20.

To permit entrapped air to move out from the left-hand end of the chamber 16 as the piston 18 is moved, a port 46 (see FIGURE 2) is formed in the wall of the cylinder 13 and in the base 47 on which the motor is mounted. The base 47 includes a longitudinal channel 48 which communicates from the port 46 to the exhaust port 34 through the channel 48 and a radial channel 49 formed in the end closure 14. A mounting pad or gasket 50 is placed between the base plate 47 and the motor 11 to cushion the motor, as is well-known in the art.

A port 44 is also formed in the wall of the cylinder 13 at an intermediate portion of the chamber (see FIGURE 1). As the piston 18 moves toward the end of its left-hand or forward stroke, communication is established from the chamber 16 through a longitudinal passageway 45 to a radial passageway 33A connecting to the servo chamber 33. More specifically, port 44 establishes communication between the compressed air on the right-hand end of the chamber 16 and the servo chamber 33 formed to the right or behind the large diameter serve portion or rear face 57 of the poppet-type valve 55 mounted approximately at the center in the end closure 14. The poppet valve includes a stem portion 58, a valve closing portion 59, and a nose portion 60. The valve closing portion 59 normally is caused to engage seat 61 formed in the end closure 14 to close the chamber 16 from port 34.

In operation, when the pressurized air being admitted through chamber 16 to the right-hand end of the piston 18 passes through the port 44, passageway 45, and passageway 33A to the servo chamber 33 behind the large diameter servo portion 57 of the valve 55, the pressure built up in the servo chamber unbalances valve 55 and unseats the valve closing portion 59 to thereby permit compressed air to escape from the right-hand end of chamber 16 through the opening 61A or cavity in valve 55 to the outlet exhaust port 34. Since air is permitted to escape from the right-hand end of chamber 16 directly to the exhaust port 34, the compression spring 20 can return piston 18 to a starting position. As the piston is moved to the right in chamber 16, its rear face contacts the extending nose portion 60 of the poppet valve 55 and forces the valve against its seat 61. When valve 55 is again seated, the chamber 16 to the right-hand side of the piston is shut off from the exhaust port and another operating cycle is begun. The foregoing operation is repeatedly continued until such time as the stem 40A of the throttle 32 is released.

Figure 3:
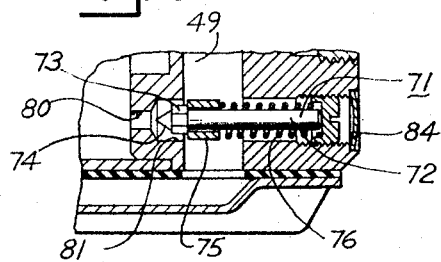
FIGURE 3 is a fragmentary view of the relief valve of FIGURE 2 with the relief valve being in an open position.

Referring to FIGURES 2 and 3, a relief valve 71 is mounted in the lower portion (as oriented in FIGURE 2) of the end closure 14. The relief valve 71 includes a valve stem 72 terminating in an enlarged valve closing section 73 which, in the embodiment shown, has a conically shaped nose or end portion 74. An enlarged sleeve 75 surrounds the forward portion of the stem 72 and has one end abutting against the valve closing section 73. A spring 76 has one end bearing against the sleeve 75 and its other end bearing against an adjusting screw 77.

The amount of force exerted by the spring 76 is adjustable through the threaded hole 83 by positioning the adjusting screw 77. Once the force of the spring is adjusted by turning the screw 77, a suitable plug 84 can then be placed into the associated counterbore. Thus, the spring 76 is under compression and maintains the valve stem 72 and the nose portion 74 extended in a position to seat against and close the orifice 80 formed in the end closure 14. Hence, the orifice 80 has its left-hand end communicating with chamber 16 and its right-hand end is normally closed by the nose 74 of the valve 71. When the valve 71 is opened, as shown in FIGURE 3, the chamber 16 communicates through orifice 80, valve opening or cavity 81, and the radial channel 49 to the exhaust port 34.

The overall function of relief valve 71 is to limit the pressure developed in chamber 16 to a predetermined value. In operation, when the selected predetermined value, as determined by the setting of spring 76, is exceeded the valve 71 will open and allow air to escape from chamber 16 through orifice 80, cavity 81, radial channel 49 and outlet port 34 through an essentially unrestricted path until pressure of the air drops to zero or a small percentage of the preset maximum value. After the air pressure in chamber 16 drops, the relief valve 71 closes and remains closed until the predetermined value is again exceeded. Thus, the relief valve 71 when used in conjunction with the air motor will limit the force which can be applied to the piston 18 by limiting the air pressure which can build up in a displacement chamber 16.

More specifically, the relief valve 71 functions as follows. As the air pressure in the displacement chamber 16 increases, an increasing force is exerted on the nose portion 74 of the valve stem 72. When the air pressure in chamber 16 reaches the preselected or preset maximum value, the valve stem 72 is caused to move away from its seat against orifice 80 and air starts to leak past the nose 74 and into the recess 81 formed in the valve 71. The air leaking past the nose 74 must pass through a low clearance passage between the sleeve 75 and the cavity 81; accordingly, a large increase in pressure occurs in cavity 81 which exerts an additional force on the valve stem 72 and sleeve 75, and against the spring 76 to rapidly move stem 72 from its seat. Compressed air from the displacement chamber 16 can now flow through orifice 80 into cavity 81 with no restriction effected by the nose portion 74 and, accordingly, this pressure is now effective against the full area of the left-hand end of sleeve 75 and stem 72.

The ratio of the area of the cavity 81 to the orifice 80 is relatively large, in one embodiment being approximately 11 to 1. Accordingly, as the pressure becomes effective against the face area of the sleeve 75, the force tending to move the valve stem 72 away from its seat and to compress the spring 76 rapidly increases by a large factor; in the embodiment shown the increase is approximately 11 times. The foregoing operation results in a very rapid opening of the valve 71. When the valve is opened, as shown in FIGURE 3, the sleeve 75 is moved out of the cavity 81 and the pressure in the displacement chamber 16 drops due to the air escaping through orifice 80. The dynamic pressure of the escaping air on the nose 74 of the valve stem 72 maintains the valve 71 in an open position until the air supply is either turned off completely or reduced significantly to a point where the amount of air-flow through orifice 80 and cavity 81 is not high enough to hold the nose 74 or stem 72 off its seat. At this point the stem 72 is again seated by the action of spring 76, and relief valve 71 will prevent air leakage unless and until the pressure in the displacement chamber 16 again reaches a predetermined value.

While the invention has been particularly shown and described with reference to a preferred embodiment thereof, it will be understood by those skilled in the art that various changes in form and details may be made therein without departing from the spirit and scope of the invention.

I claim:
1. A fluid motor comprising,
a member having a piston chamber formed therein;
means closing the ends of said chamber;
a piston reciprocally mounted within said chamber;
a fluid supply passageway arranged to connect an associated source of fluid under pressure to said chamber;
a first valve means selectively operable to open and establish communication between said supply passageway and said chamber;
an exhaust passageway;
freely reciprocable valve means operable when seated to close said chamber from said exhaust passageway and when unseated to establish direct communication between said chamber and said exhaust passageway;
means urging said piston to an initial position and said piston being moved in a first direction by fluid under-pressure;
a connecting passageway communicating with an intermediate portion of said chamber and said reciprocable valve dependent upon the position of said piston to enable fluid under pressure from said chamber to unseat the reciprocable valve and thereby open said chamber to said exhaust passageway and thereby enable said piston to return toward its initial position and initiate a succeeding cycle;
means for limiting pressure in said chamber to a selected value, said means including a flow passage of uniform cross-sectional dimension except for an orifice of abruptly restricted cross-sectional dimension at the juncture between said flow passage and said chamber;
a valve stem having an enlarged end portion receivable in said orifice to close the same and movable toward and away from an orifice closing position in response to movement of said stem in said flow passage toward and away from said orifice, a sleeve mounted on said stem substantially closing the area between the stem and the wall of the flow passage opposite thereto, said sleeve having a first end surface facing toward the outlet end of said flow passage;
a spring acting against said first end surface of the sleeve to normally urge said stem toward an orifice closing position;
said sleeve having a second end surface facing toward said orifice defining a relatively steep working area substantially exceeding the working area of the enlarged end portion of the valve stem exposed to pressure within the chamber when said stem is in orifice opening position.

2. A fluid motor in accordance with claim 1 wherein said enlarged end portion of said valve stem of said pressure limiting means is of conical shape.

References Cited

UNITED STATES PATENTS

| | | | |
|---|---|---|---|
| 269,978 | 1/1883 | Wheelock | 91—240 |
| 511,650 | 12/1893 | Prusmann | 137—477 |
| 2,292,294 | 8/1942 | Rotter et al. | 137—469 |
| 3,074,425 | 1/1963 | Kikendall | 137—477 |
| 3,079,900 | 3/1963 | Hunnicutt | 91—290 |
| 3,195,556 | 7/1965 | Norstrud et al. | 137—469 X |

CARROLL B. DORITY, JR., Primary Examiner

U.S. Cl. X.R.

91—243, 290, 452; 103—50; 137—477